United States Patent
Mathews et al.

(10) Patent No.: US 10,901,617 B2
(45) Date of Patent: Jan. 26, 2021

(54) MEMORY ACCESS SCHEDULING USING CATEGORY ARBITRATION

(71) Applicant: Apple Inc., Cupertino, CA (US)

(72) Inventors: Gregory S. Mathews, Saratoga, CA (US); Shane J. Keil, San Jose, CA (US); Sukalpa Biswas, Fremont, CA (US); Lakshmi Narasimha Murthy Nukala, Pleasanton, CA (US); Thejasvi Magudilu Vijavaraj, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/565,386

(22) Filed: Sep. 9, 2019

(65) Prior Publication Data

US 2020/0081622 A1 Mar. 12, 2020

Related U.S. Application Data

(60) Provisional application No. 62/730,408, filed on Sep. 12, 2018.

(51) Int. Cl.
*G06F 12/00* (2006.01)
*G06F 3/06* (2006.01)

(52) U.S. Cl.
CPC .......... *G06F 3/0604* (2013.01); *G06F 3/0655* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 6,704,821 B2 | 3/2004 | Scandurra et al. | |
| 7,353,310 B2 | 4/2008 | Roever | |
| 8,285,914 B1 | 10/2012 | Venkatramani et al. | |
| 8,314,807 B2 | 11/2012 | Biswas et al. | |
| 8,762,653 B2 | 6/2014 | Biswas et al. | |
| 9,135,072 B2 | 11/2015 | Biswas et al. | |
| 2018/0217951 A1* | 8/2018 | Benisty | G06F 13/1642 |

* cited by examiner

*Primary Examiner* — Jason W Blust
(74) *Attorney, Agent, or Firm* — Kowert, Hood, Munyon, Rankin & Goetzel, P.C.

(57) ABSTRACT

A memory controller circuit coupled to a memory circuit that includes multiple banks may receive multiple access requests including a particular access request to a particular bank of the plurality of banks. The particular access request is associated with a particular virtual channel of a plurality of virtual channels. The memory controller circuit may select a given access requests of the multiple access requests based on an arbitration category value associated with a virtual channel of the given access request and modify the arbitration category value in response to selecting the given access request.

20 Claims, 8 Drawing Sheets

US 10,901,617 B2

MEMORY ACCESS SCHEDULING USING CATEGORY ARBITRATION

PRIORITY INFORMATION

This application claims the benefit of U.S. Provisional Application No. 62/730,408, filed on Sep. 12, 2018, which is incorporated by reference herein in its entirety.

BACKGROUND

Technical Field

The embodiments described herein generally relate memory access within computer systems, and more particularly, to scheduling memory access requests using arbitration categories.

DESCRIPTION OF THE RELEVANT ART

Computer systems, including systems-on-a-chip (SoCs), include processors and multiple memory circuits that store software programs or applications, as well as data being operated on by the processors. Such memory circuits may vary in storage capacity as well as access time. In some computer systems, some memory circuits are coupled to the processors via a memory controller circuit via a communication link or other communication network.

During operation of a computer system, the processors, which may include processor cores, graphics processors, and the like, transmit requests for access to the memory controller via the communication link. Such requests may include requests to retrieve previously stored data from the memory circuits or requests to store new data in the memory circuits. The memory controller receives the requests and arbitrates access to the memory circuits for the requests based on various criteria. Upon relaying a particular request from a processor to the memory circuits, the memory controller circuit waits until the memory circuits have completed the particular request, at which point the memory controller circuit sends an acknowledge signal and, in the case of a read access, requested data to the processor that initiated the request.

SUMMARY OF THE EMBODIMENTS

Various embodiments of a computing system are disclosed. Broadly speaking, an apparatus and a method are contemplated, in which a memory circuit includes a plurality of banks and a memory controller circuit coupled to the memory circuit via a bus, where the memory controller circuit is configured to: receive a plurality of access requests, each of which is directed to one of the plurality of banks and associated with one of a plurality of quality-of-service levels, and schedule a subset of the plurality of access requests to be sent to the memory circuit via the bus according to an order. To determine the order, the memory controller circuit is further configured to: maintain a plurality of arbitration category values, including ones that correspond to a given bank and a given quality-of-service level, select, based on one or more of the plurality of arbitration category values, a particular one of the plurality of access requests that is directed to a particular bank and is associated with a particular quality-of-service level, and modify a particular arbitration category value that corresponds to the particular bank and particular quality-of-service level.

These and other embodiments will become apparent upon reference to the following description and accompanying drawings.

Figure 1:
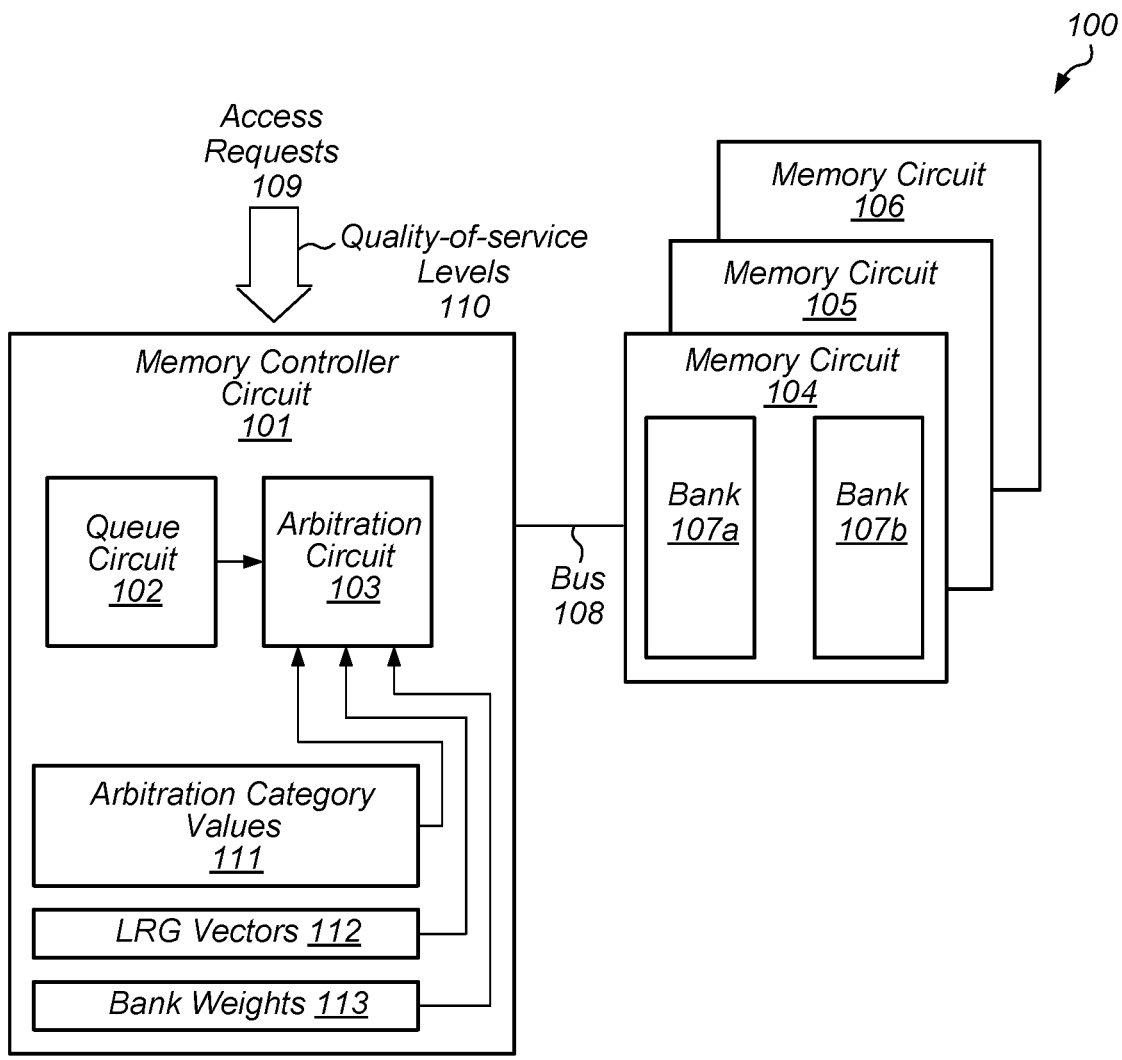
FIG. 1 is a generalized block diagram illustrating an embodiment of a memory system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

During operation of a computing system, processors, processor cores, and other processing circuits generate requests to access memory circuits (commonly referred to as "memory access requests"). Such requests may be to store data into a memory circuit, retrieve program instructions from the memory circuit, retrieve data from the memory circuit for further processing, retrieve data from the memory circuit for display, speculative retrieval from the memory circuit of program instructions or data to fill cache memories, and the like. Depending on the type of information being stored or retrieved, or the purpose for which retrieved information is being used, a priority level may be assigned a particular memory access request through the use of quality-of-service levels (also referred to herein as "virtual channels"), specified for the memory access requests.

An arbitration circuit included in a memory controller circuit selects a particular access request for assignment to a slot during a turn (one set of read access and write access to a memory circuit). The arbitration circuit may select the particular access request based on a quality-of-service level to which the particular access request is assigned. Such an assignment method, however, may result in particular banks within the memory circuit being used more heavily than other banks. The embodiments illustrated in the drawings and described below may provide techniques for performing arbitration amongst memory access requests while providing for a fair distribution of memory access requests across the banks of a memory circuit.

An embodiment of a memory system is illustrated in FIG. 1. As shown, memory system 100 includes memory controller circuit 101 coupled to memory circuits 104 through 106 via bus 108.

Each of memory circuits 104 through 106 may include multiple banks. For example, memory circuit 104 includes banks 107a and 107b. As used and described herein, a bank is a portion of a memory array in a memory circuit that be independently accessed from other portions of the memory array. Although FIG. 1 depicts only two banks as being included in memory circuit 104, in other embodiments, any suitable number of banks may be employed.

Memory circuits 104 through 106 may be any suitable type of memory circuit. For example, in various embodiments, memory circuits 104 through 106 may be dynamic random-access memories (DRAMs), static random-access memories (SRAMs), non-volatile memories, read-only memories (ROMs), and the like. It is noted that although memory system 100 is depicted as including only three memory circuits, in other embodiments, any suitable number of memory circuits may be employed.

Memory controller circuit 101 includes queue circuit 102, arbitration circuit 103, arbitration category values 111, and LRG vectors 112 and is configured to receive a plurality of access requests, each of which is directed to one of the plurality of banks and associated with one of the plurality of quality-of-service levels. For example, memory controller circuit 101 may receive access requests 109 each of which may be associated with a particular one of quality-of-service levels 110. As described below in more detail, access requests 109 may be stored in queue circuit 102 pending selection for sending to one of memory circuits 104-106.

In various embodiments, memory controller circuit 101 is also configured to schedule a subset of the plurality of access requests to be sent to the memory circuit via the bus according to an order. To determine the order, memory controller circuit 101 is configured to maintain a plurality of arbitration category values, including ones that correspond to a given bank and a given quality-of-service level. As described below in more detail, arbitration category value 111 may be stored in one or more registers on a per bank and per quality-of-service level basis.

As used and described herein, an arbitration category value is a multi-bit value that specifies one of multiple categories indicative of a priority associated with a particular quality-of-service level for a given bank in a memory circuit. An arbitration category value, as is described below in more detail, may be stored as multiple data words in multiple mask vectors.

Memory controller circuit 101 is also configured to select, based on one or more of the plurality of arbitration category values, a particular one of the plurality of access requests that is directed to a particular bank and is associated with a particular quality-of-service level. For example, arbitration circuit 103 may select an access request stored in queue circuit 102. Once selected, the request may be sent, via bus 108, to a given bank in a particular memory circuit specified by the access request. In some cases, the access request may be re-formatted or translated into multiple atomic commands compatible with a communication protocol used by bus 108.

Memory controller circuit 101 is also configured to modify a particular arbitration category value that corresponds to the particular bank and particular quality-of-service level. In various embodiments, memory controller circuit 101 is configured to change the arbitration category value from an initial value to a subsequent value that has a lower priority than the initial value.

To assist in maintaining fairness across banks within a memory circuit, memory controller circuit 101 is configured to, in response to a determination that, respective arbitration categories for each bank of the plurality of banks is less than a maximum value, increment values for the respective arbitration category values for each bank. By modifying the arbitration category values in such a fashion, each bank has an equal chance to be used and once a bank has been used, it has a lower priority until all banks are used for that arbitration category. Once this occurs, the priority of all banks is increased again (for that arbitration category).

Additionally, memory controller circuit 101 is configured to track a respective number of times which quality-of-service level was last granted access to a particular bank. Such information is stored in least recently granted (LRG) vectors 112. As described below in more detail, memory controller circuit 101 may be configured to, in response to a determination that multiple access requests to a given bank each have a same arbitration category value for the given bank, select a particular one of multiple access requests based on which quality-of-service level of the plurality of quality-of-service levels last access the given bank.

Additionally, memory controller circuit 101 may be configured to select a different access request based on a number of times access has been granted to a given bank specified in the different access requests. By using the number of times individual banks have been accessed, memory controller circuit 101 can give priority to banks that have little activity, thereby maintaining a similar level of activity across all of the banks in a memory circuit.

During per bank arbitration, the arbitration category values for multiple banks may be the same. When this occurs, different information may be used to determine which bank should be selected of next access request. Such different information can include weights for banks. For example, in some embodiments, bank weights are stored in bank weights 113, which may be a particular embodiment of a register or register file. A particular bank weight may be based on number of requests for the particular bank stored in queue circuit 102 as well as number of times access has been granted to the particular bank, and/or the age of the requests at the head of each bank queue (age-order bias). Memory controller circuit 101 may used the bank weights to assign a priority to each bank in order to break ties and select a bank.

In some cases, access requests associated with a lowest level arbitration category value may be handled different from other access requests. Rather than a selection criteria used for other arbitration category values, when arbitrating lowest level arbitration category access requests, memory contoller may first select access requests associated with a low latency quality-of-service level, followed by access requests associated with a bulk virtual channel, followed by access requests associated a real time quality-of-service level. For example, memory controller circuit 101 is configured to, when scheduling access requests associated with a lowest level arbitration category, select a different access request associated with a low latency quality-of-service level.

It is noted that embodiment depicted in FIG. 1 is merely an example. In other embodiments, different numbers of memory circuits, and different arrangements of circuit blocks within memory controller circuit 101 may be employed.

Figure 2:
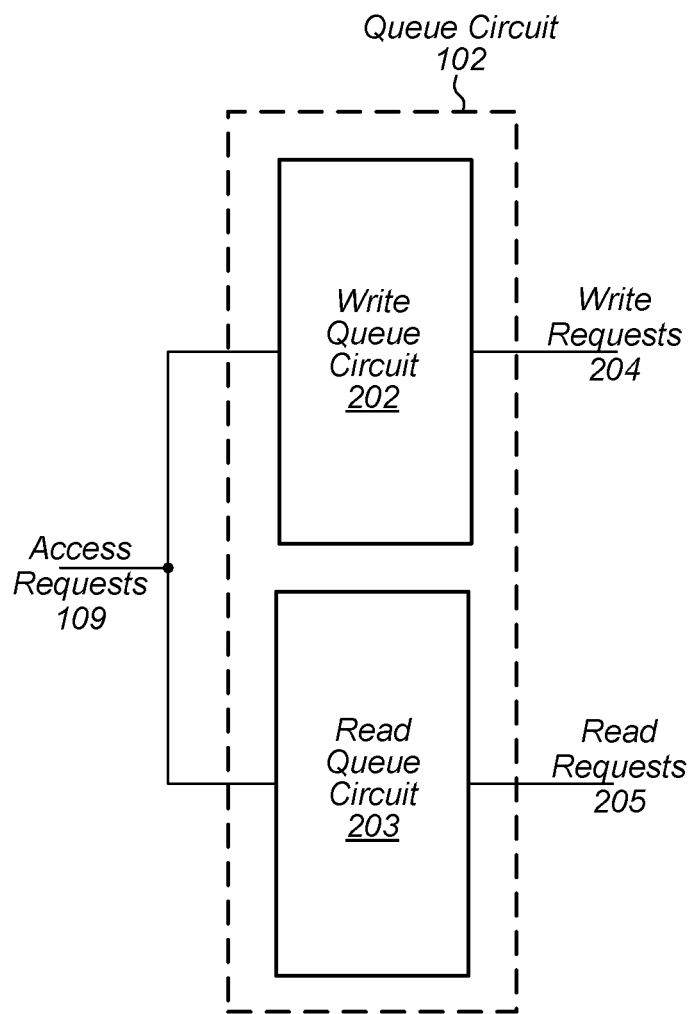
FIG. 2 illustrates a block diagram depicting an embodiment of a queue circuit.

As described above, incoming access request are stored in queue circuit 102 until they are scheduled. A block diagram of an embodiment of queue circuit 102 is illustrated in FIG. 2. As shown, queue circuit 102 includes write queue circuit 202 and read queue circuit 203.

Access requests 109 include both read access requests and write access requests. In order to better utilize memory circuits, read access requests and write access requests may be treated separately for the purposes of scheduling within a given turn.

To facilitate treating the scheduling of read access requests and write access requests, each type of access request is stored separately. For example, read access requests are stored in read queue circuit 203 and write access requests are stored in write queue circuit 202. Each of read queue circuit 203 and write queue circuit 202 may store a particular number of access requests. In some cases, in addition to storing a particular access request in one of read queue circuit 203 or write queue circuit 202, additional information, such as, e.g., associated virtual channel information, and the like, may be stored along with the particular access request.

Each of read queue circuit 203 and write queue circuit 202 may be particular embodiments of register files or other suitable data storage circuits. For example, in some cases, read queue circuit 203 and write queue circuit 202 may be implemented using static random-access memories (SRAMs). In some embodiments, read queue circuit 203 and write queue circuit 202 may include multiple access ports allowing for the storage of incoming access requests in parallel with reading previously stored access requests by arbitration circuit 103.

For a given turn, an arbitration circuit, such as, e.g., arbitration circuit 103, will select an appropriate number of read requests 205 from read queue circuit 203 and write requests 204 from write queue circuit 202 for populating slots included in the given turn. In various embodiments, a number of access requests stored in read queue circuit 203 and write queue circuit 202 may be based on an a desired level of efficiency of memory utilization or any other suitable parameter.

It is noted that the embodiment of queue circuit 102 depicted in FIG. 2 is merely an example. In other embodiments, different queue depths for both read and write access requests may be employed.

Figure 3:
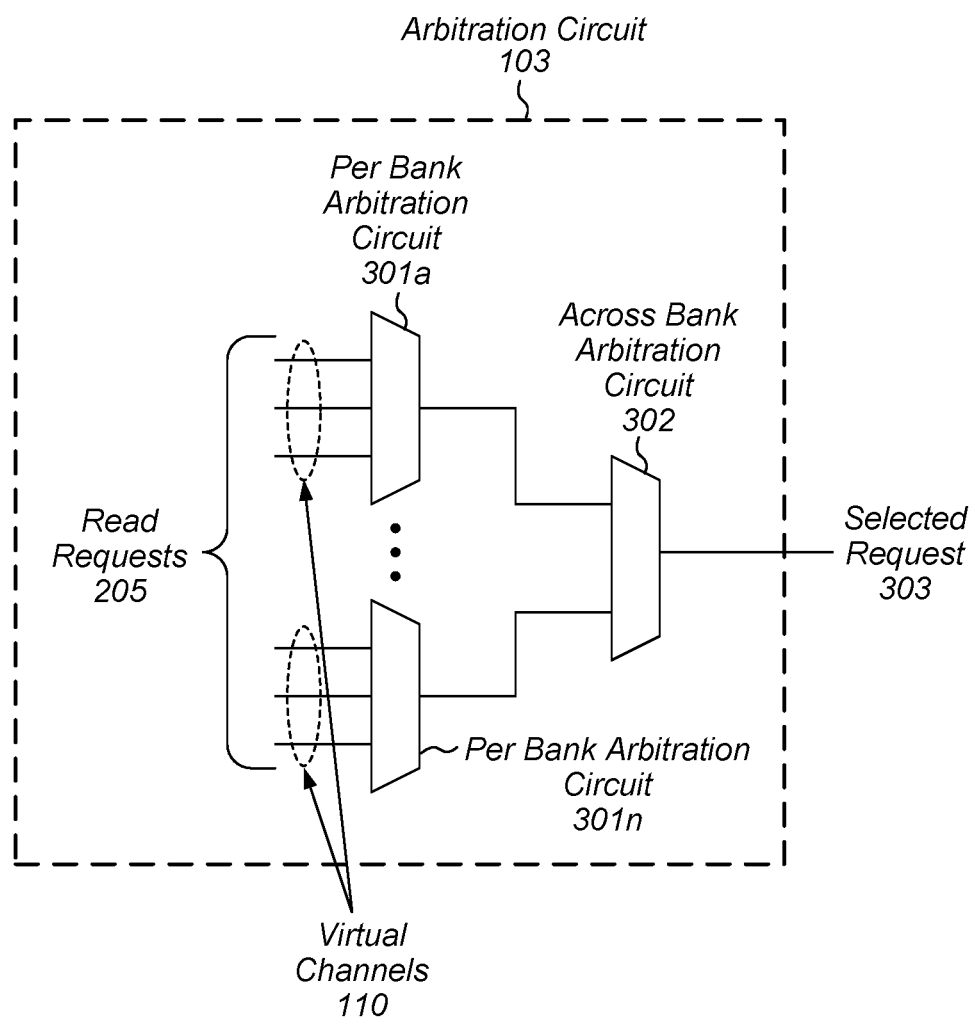
FIG. 3 illustrates a block diagram depicting an embodiment an arbitration circuit.

Within a particular turn, each slot included in the turn is populated with a selected read or write request. In the case of read requests and as described above, read requests are selected on a per bank basis, and then on an across bank basis. To accomplish such selection, a multi-stage arbitration circuit may be employed. A block diagram depicting an embodiment of arbitration circuit 103 is illustrated in FIG. 3. As shown, arbitration circuit 103 includes per bank arbitration circuits 301a-n, the outputs of which are coupled to across bank arbitration circuit 302.

Each of per bank arbitration circuits 301a-n, which may be particular embodiments of multiplex circuits, is associated with a respective bank of multiple banks included in a memory circuit. For a given bank, a corresponding one of per bank arbitration circuits 301a-n is configured to select an access request from read requests 205 directed to the given bank. The selection may be made based on virtual channels associated with the individual ones of read requests 109, or other suitable priority information. Outputs from each of per bank arbitration circuits 301a-n are coupled to across bank arbitration circuit 302, which selects a particular one of the outputs for assignment to a slot included in an upcoming turn.

Across bank arbitration circuit 302 is configured to select a particular output of per bank arbitration circuits 301a-n to generate selected request 303. The selection may be made based on a number of available credits for individual virtual channels, arbitration categories (as described above), and any other suitable information. For example, across bank arbitration circuit 302 may use any override information associated with a request, available slots within a turn for low latency virtual channel, and the like. In various embodiments, across bank arbitration circuit 302 may be a particular embodiment of a multiplex circuit that may include any suitable combination of static logic gates, complex logic gates, or other logic circuits.

It is noted that the embodiment depicted in FIG. 3 is merely an example, and that, in other embodiments, different numbers of per bank arbitration circuits may be employed.

Figure 4:
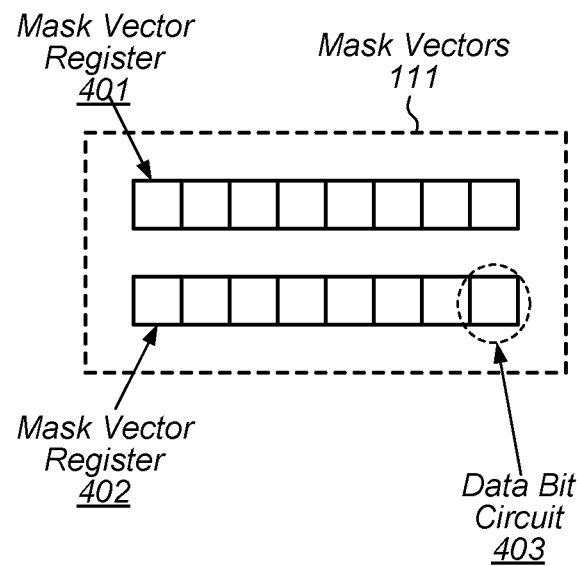
FIG. 4 illustrates a block diagram depicting an embodiment of mask vectors.

Arbitration category information may be managed in numerous ways. As described above, one management technique includes the use of mask vectors. A block diagram of an embodiment of mask vectors included in arbitration category values 111 is illustrated in FIG. 4. As shown, arbitration category values 111 includes mask vector registers 401 and 402. In some cases, one of mask vector registers 401 and 402 may be designated as a primary register and the other designated as a secondary register. It is noted that although only a single pair of mask registers are depicted in FIG. 4, in other embodiments, a pair of mask registers may be employed for each virtual channel.

Each of mask vector registers 401 and 402 include multiple data bits, such as data bit circuit 403, for example. The number of data bit circuits includes in mask vector registers 401 and 402 may correspond to a number of banks in a memory circuit. In various embodiments, each data bit circuit may be a particular embodiment of a latch circuit, a flip-flop circuit, or other circuit configured to store a single data bit. It is noted that although a pair of mask vector registers is illustrated in FIG. 4, which results in four possible arbitration categories, in other embodiments, each virtual channel may have a dedicated set of mask vectors.

During operation, when a read access request is selected for a particular virtual channel, a data bit in the primary register for the particular virtual channel is set. The data bit may correspond to the bank that won arbitration. If the data bit is already set in the primary register, then a corresponding bit will be set in the secondary register.

When a primary mask vector for a given virtual channel does not allow for further requests (i.e., the values in the vector "mask" access to the banks), the contents of the secondary register is copied into the primary register and the secondary may be cleared or set to a particular value.

As mentioned above, the combination of values in the primary and second registers determine a value of an arbitration category used to classify an access request. For example, if neither the primary and secondary register bit is set for a bank, then the arbitration category value is 3, which may be given a highest priority. When the primary register bit is set and the secondary register bit is not set, then the arbitration category value is 2. When a slot is available in a particular turn and the arbitration category value is neither 3 nor 2, then the value is considered to be 1. The arbitration category is zero if there are no slots available. It is noted that for a request to be classified as either 3, 2, or 1 then at least two slots must be available.

In some embodiments, a request that is the oldest pending request for a given virtual channel may be classified as category 3 for arbitration if at least two slots are available. In some cases, such a classification may be made after the primary and secondary register values take effect.

By utilizing mask vectors in this fashion, read access scheduling is performed in such a way that read access requests associated with respective virtual channels are fairly distributed across the banks of a memory circuit. It is noted that the embodiment of mask vectors 111 depicted in FIG. 4 is merely an example. In other embodiments, additional mask vector registers may be included to allow for more arbitration category levels.

Figure 5:
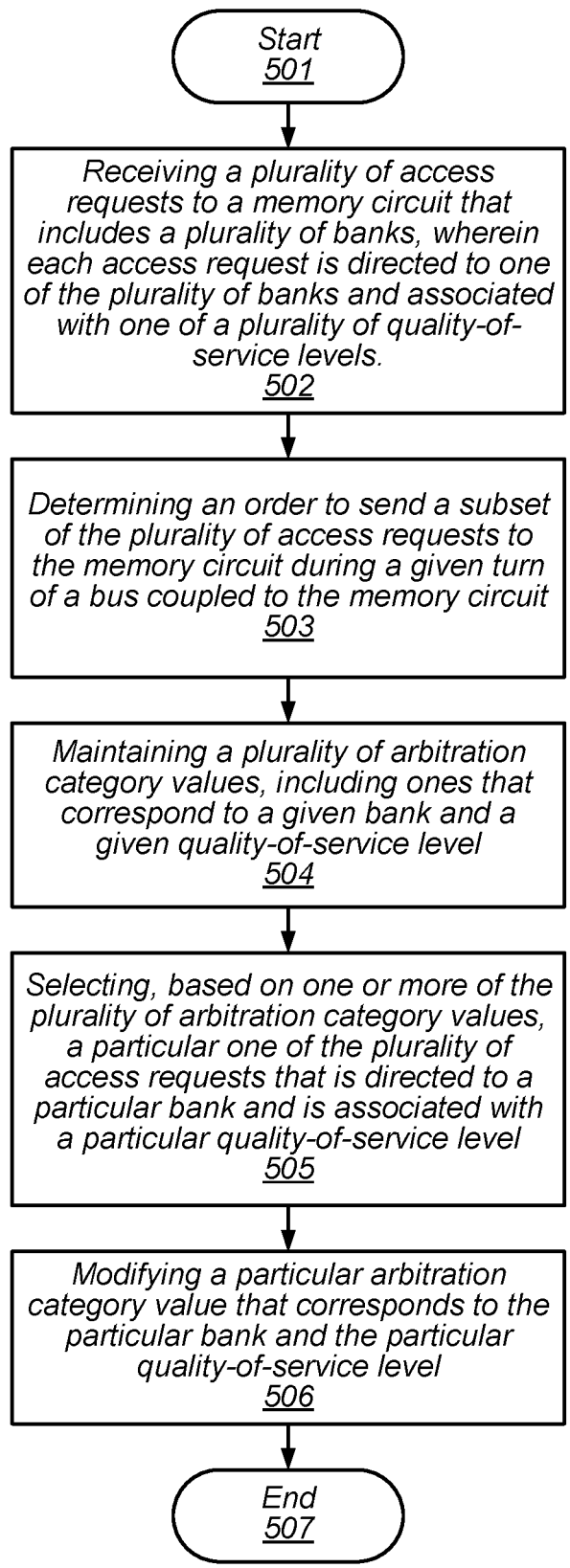
FIG. 5 illustrates a flow diagram depicting an embodiment of a method for scheduling memory access requests based on arbitration categories.

Turning to FIG. 5, a flow diagram depicting an embodiment of a method for operating a memory controller circuit is illustrated. The method, which begins in block 501, may be applied to memory controller circuit 101 as depicted in FIG. 1 or any other suitable memory controller circuit.

The method includes receiving a plurality of access requests to a memory circuit that includes a plurality of banks, wherein each access request is directed to one of the plurality of banks and associated with one of a plurality of quality-of-service levels (block 502). In various embodiments, such access requests may be received from a processor, processor core, or other suitable agent configured to transmit access memory access requests to the memory controller circuit via a communication bus using a particular communication protocol.

The method further includes determining an order to send a subset of the plurality of requests to the memory circuit during a given turn of a bus coupled to the memory (block 503). For a given turn of the bus, a memory controller circuit may select multiple different access requests of the receive access requests to for inclusion in a set of access requests to be sent to the memory circuit. As described below in more detail, the selection may be made using arbitration category values as well as any other suitable criteria.

To determine the order, the method includes maintaining a plurality of arbitration category values, including ones that correspond to a given bank and a given quality-of-service level (block 504). As described above, the arbitration category values may be stored in multiple registers on a per bank and per quality-of-service level basis.

The method further includes selecting, based on one or more of the plurality of arbitration category values, a particular one of the plurality of access requests that is directed to a particular bank and is associated with a particular quality-of-service level (block 505). As described above, a series of multiplex circuits may be used select the particular one of the plurality of access requests using the arbitration category values or any other suitable criteria.

The method also includes modifying the arbitration category value for the particular bank associated with the particular virtual channel in response to selecting the given access request (block 504). In some cases, modifying the arbitration category includes decrementing the arbitration category value. As described above, an arbitration category value may range from 0 to 3 and may be decremented each time an access requests to a given bank and associated with a given quality-of-service level is granted access to the given bank. In various embodiments, the arbitration category value may be encoded using multiple bits stored in respective register circuits.

The memory controller circuit may be monitoring, for each quality-of-service level, the arbitration category values associated with each bank. In such cases, the method may also include incrementing respective arbitration category values associated with each bank of the plurality of banks for a given quality-of-service level, in response to determining that each of the respective arbitration category value is less than an initial value. By incrementing the arbitration category values in such a fashion, fairness of access across the banks for a given virtual channel is maintained by resetting the arbitration category values for each bank once a quality-of-service level has accessed each bank.

As described above, the memory controller circuit may track which quality-of-service level was last granted access to a particular bank. This information may used when access requests associated with different quality-of-service levels and targeting the same bank have the same arbitration category value. When this occurs, the method also includes, in response to determining that multiple access requests to a given bank each have a same arbitration category value for the given bank, selecting a particular one of multiple access requests based on which quality-of-service level of the plurality of quality-of-service levels last access the given bank, wherein each of the multiple access request is associated with a respective one of the plurality of quality-of-service levels.

In various embodiments, the lowest value of an arbitration category value may be handled different when selecting an access request for access to a given bank. For such values of the arbitration category value, the method further includes, in response to determining that, for a given bank, associated arbitration category values for each quality-of-service level of the plurality of quality-of-service levels are each a lowest value, selecting a given access request for access the given bank from a low latency quality-of-service level of the plurality of quality-of-service levels.

As noted above, bank arbitration is performed over a particular turn of access requests. Once the turn has completed, if a given quality-of-service level for a particular bank has run out of allocated bandwidth credits, the given quality-of-service level for the particular bank may be granted more bandwidth credits and it will return to the last non-zero category it had for the particular bank. The method concludes in block 505.

Figure 6:
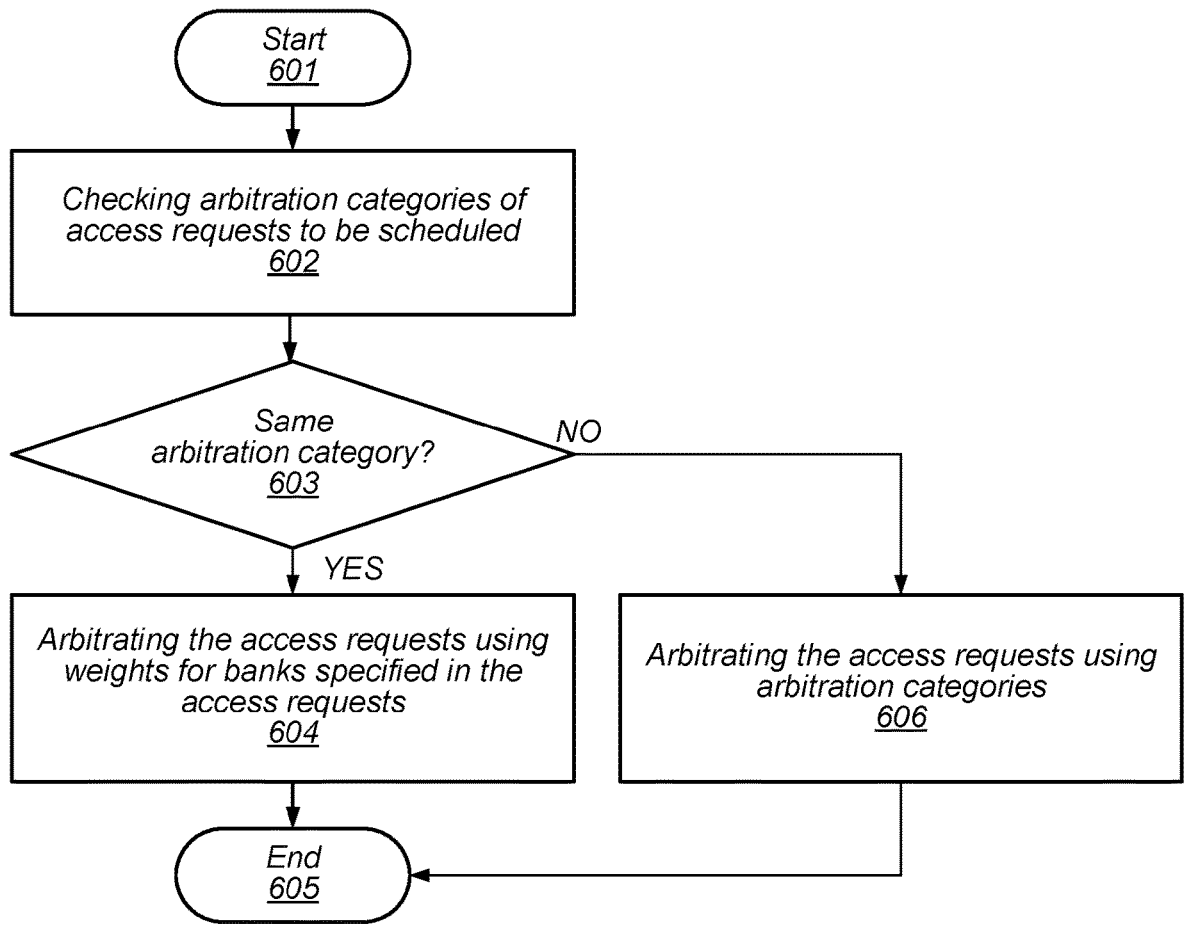
FIG. 6 illustrates a flow diagram depicting an embodiment of a method scheduling memory access requests based on bank weights.

In some cases, received access requests may have the same arbitration category which may create difficulties in determining an order in which to process the access requests. When this occurs, other criteria may be employed to perform the selection. An embodiment of a method for using weights associated with individual banks in the arbitration process is illustrated in the flow diagram of FIG. 6. The method, which begins in block 601, may be applied to memory controller circuit 101 or any other suitable memory controller circuit.

The method includes, checking arbitration categories of access requests to be scheduled (block 602). As described above, each access request may have an associated arbitration category that may be received from a processor, processor core, or other suitable agent configured to transmit access memory access requests to the memory controller circuit via a communication bus using a particular communication protocol. The method may then depend on the arbitration categories for the access requests (block 603).

If all of the access requests undergoing the arbitration process have the same arbitration category, then method includes arbitrating the access requests using weights for banks specified in the access requests (block 604). For example, if two access requests have the same arbitration category, and a particular one of the access requests is for a bank with a greater weight than a bank specified in the other request, the particular one of the access requests will be selected. The method then concludes in block 605.

Alternatively, if the access requests have different arbitration categories, then then method includes arbitrating the access requests using the arbitration categories (block 606). In various embodiments, the aforementioned arbitration may be performed using a method similar to that depicted in the flow diagram of FIG. 5. The method then concludes in block 605.

Figure 7:
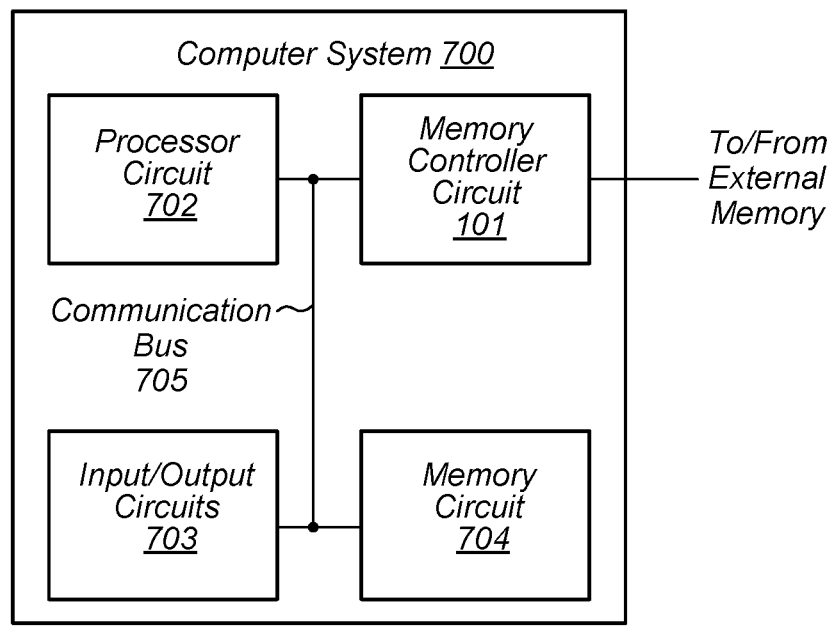
FIG. 7 illustrates a block diagram of an embodiment of a computer system.

A block diagram of computer system is illustrated in FIG. 7. In the illustrated embodiment, the computer system 700 includes memory controller circuit 701, processor circuit 702, input/output circuits 703, and memory circuit 704, each of which may be configured to send requests and data (collectively transactions) the other circuit blocks using communication bus 705. In various embodiments, computer system 700 may be a system-on-a-chip (SoC) and may be configured for use in a desktop computer, server, or in a mobile computing application such as, e.g., a tablet, laptop computer, or wearable computing device. Although four circuit blocks are depicted in the embodiment of FIG. 7, in other embodiments, any suitable number of circuit blocks may be included in computer system 700.

Memory controller circuit 701 is configured to schedule access requests to external memory. In various embodiments, memory controller circuit 701 may correspond to memory controller 101 as illustrated in FIG. 1, and the access requests may include both memory read access requests and memory write access requests. Such access requests may be received from processor circuit 702, input/output circuits 703, or any other suitable circuit block (not shown) included in computer system 700. As described above, memory controller circuit 701 may scheduled the access requests for execution by the external memory. Additionally, memory controller circuit 701 may generate one or more commands compatible with the external memory in response to scheduling a particular access request.

Processor circuit 702 may, in various embodiments, be representative of a general-purpose processor that performs computational operations. For example, processor circuit 702 may be a central processing unit (CPU) such as a microprocessor, a microcontroller, an application-specific integrated circuit (ASIC), or a field-programmable gate array (FPGA).

Memory circuit 704 may include any suitable type of memory such as a Dynamic Random-Access Memory (DRAM), a Static Random-Access Memory (SRAM), a Read-only Memory (ROM), Electrically Erasable Programmable Read-only Memory (EEPROM), or a non-volatile memory, for example. It is noted that in the embodiment of an integrated circuit illustrated in FIG. 7, a single memory circuit is depicted. In other embodiments, any suitable number of memory circuits may be employed.

Input/output circuits 703 may be configured to coordinate data transfer between computer system 700 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 703 may be configured to implement a version of Universal Serial Bus (USB) protocol or IEEE 1394 (Firewire®) protocol.

Input/output circuits 703 may also be configured to coordinate data transfer between computer system 700 and one or more devices (e.g., other computing systems or integrated circuits) coupled to computer system 700 via a network. In one embodiment, input/output circuits 703 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 703 may be configured to implement multiple discrete network interface ports.

Figure 8:
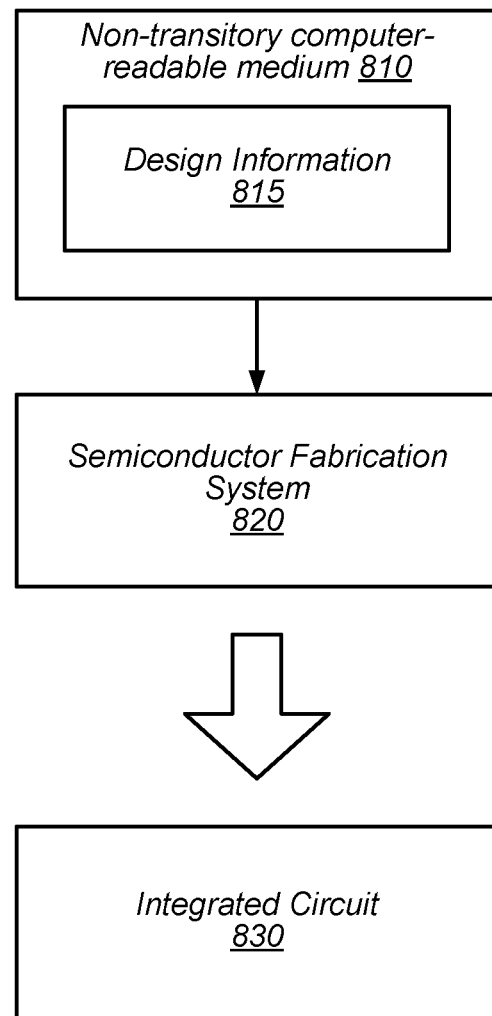
FIG. 8 illustrates a block diagram of a computer-readable medium storing design information for an integrated circuit.

FIG. 8 is a block diagram illustrating an example non-transitory computer-readable storage medium that stores circuit design information, according to some embodiments. In the illustrated embodiment, semiconductor fabrication system 820 is configured to process the design information 815 stored on non-transitory computer-readable storage medium 810 and fabricate integrated circuit 1030 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system, such as semiconductor fabrication system 820, for example. In some embodiments, design information 815 may include a netlist that specifies elements of a cell library, as well as their connectivity. One or more cell libraries used during logic synthesis of circuits included in integrated circuit 830 may also be included in design information 815. Such cell libraries may include information indicative of device or transistor level netlists, mask design data, characterization data, and the like, of cells included in the cell library.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown or described herein. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
 a memory circuit including a plurality of banks;
 a memory controller circuit coupled to the memory circuit via a bus, wherein the memory controller circuit is configured to:
  receive a plurality of access requests, each of which is directed to one of the plurality of banks and associated with one of a plurality of quality-of-service levels;
  schedule a subset of the plurality of access requests to be sent to the memory circuit via the bus according to an order, wherein to determine the order, the memory controller circuit is further configured to:
   maintain a plurality of arbitration category values, including ones that correspond to a given bank and a given quality-of-service level;
   select, based on one or more of the plurality of arbitration category values, a particular one of the plurality of access requests that is directed to a particular bank and is associated with a particular quality-of-service level; and
   modify a particular arbitration category value that corresponds to the particular bank and particular quality-of-service level.

2. The apparatus of claim 1, wherein to modify the particular arbitration category value, the memory controller circuit is further configured to change the particular arbitration category value from an initial value to a subsequent value that has a lower priority than the initial value.

3. The apparatus of claim 1, wherein the memory controller circuit is further configured to, in response to a determination that, respective arbitration category values for each bank of the plurality of banks is less than a maximum value, increment values for the respective arbitration category values for each bank.

4. The apparatus of claim 1, wherein the memory controller circuit is further configured to track a respective number of times access is granted to each bank of the plurality of banks.

5. The apparatus of claim 4, wherein the memory controller circuit is further configured to select a different access request based on a number of times access has been granted to a given bank specified in the different access request.

6. The apparatus of claim 1, wherein the memory controller circuit is further configured to, when scheduling access requests associated with a lowest level arbitration category, select a different access request associated with a low latency virtual channel.

7. A method, comprising:
 receiving a plurality of access requests to a memory circuit that includes a plurality of banks, wherein each access request is directed to one of the plurality of banks and associated with one of a plurality of quality-of-service levels;

determining an order to send a subset of the plurality of access requests to the memory circuit during a given turn of a bus coupled to the memory circuit by:

maintaining a plurality of arbitration category values, including ones that correspond to a given bank and a given quality-of-service level;

selecting, based on one or more the plurality of arbitration category values, a particular one of the plurality of access requests that is directed to a particular bank and is associated with a particular quality-of-service level; and modifying a particular arbitration category value that corresponds to the particular bank and the particular quality-of-service level.

8. The method of claim 7, wherein modifying the particular arbitration category value includes decrementing the particular arbitration category value that corresponds to the particular bank and the particular quality-of-service level.

9. The method of claim 8, further comprising incrementing respective arbitration category values associated with each bank of the plurality of banks for a given virtual channel in response to determining that each of the respective arbitration category values is less than an initial value.

10. The method of claim 7, further comprising, in response to determining that multiple access requests to a given bank each have a same arbitration category value for the given bank, selecting a particular one of multiple access requests based on a quality-of-service level of an access request that last accessed the given bank, wherein each of the multiple access requests is associated with a respective one of the plurality of quality-of-service levels.

11. The method of claim 7, further comprising, in response to determining that, for a given bank, associated arbitration category values for each quality-of-service level of the plurality of quality-of-service levels are each a lowest value, selecting an given access request for access the given bank from a low latency quality-of-service level of the plurality of quality-of-service levels.

12. The method of claim 7, further comprising, initializing, for each quality-of-service level of the plurality of quality-of-service levels, respective arbitration category values associated with each bank of the plurality of banks, in response to determining a turn of access requests has been completed.

13. The method of claim 7, further comprising, prior to selecting the particular one of the plurality of access requests, selecting the particular bank of the plurality of banks prior based on respective weights associated with each bank of the plurality of banks.

14. A non-transitory computer-readable storage medium having design information stored thereon, wherein the design information specifies a design of at least a portion of a hardware integrated circuit in a format recognized by a semiconductor fabrication system that is configured to use the design information to produce the hardware integrated circuit according to the design information, wherein the design information specifies that the hardware integrated circuit comprises:

a queue circuit configured to store a plurality of access requests including a particular access request to a particular bank of a plurality of banks included in a memory circuit, wherein the particular access request is associated with a particular virtual channel of a plurality of virtual channels;

an arbitration circuit configured to:

receive a plurality of access requests, each of which is directed to one of the plurality of banks and associated with one of a plurality of quality-of-service levels;

schedule a subset of the plurality of access requests to be sent to the memory circuit via a bus according to an order, wherein to determine the order, the arbitration circuit is further configured to:

maintain a plurality of arbitration category values, including ones that correspond to a given bank and a given quality-of-service level;

select, based on one or more of the plurality of arbitration category values, a particular one of the plurality of access requests that is directed to a particular bank and is associated with a particular quality-of-service level; and modify a particular arbitration category value that corresponds to the particular bank and particular quality-of-service level.

15. The non-transitory computer-readable storage medium of claim 14, wherein to modify the particular arbitration category value, the arbitration circuit is further configured to change the particular arbitration category value from an initial value to a subsequent value that has a lower priority than the initial value.

16. The non-transitory computer-readable storage medium of claim 14, wherein the arbitration circuit is further configured to, in response to a determination that, respective arbitration category values for each bank of the plurality of banks is less than a maximum value, increment values for the respective arbitration category values for each bank.

17. The non-transitory computer-readable storage medium of claim 14, wherein the arbitration circuit is further configured to track a respective number of times access is granted to each bank of the plurality of banks.

18. The non-transitory computer-readable storage medium of claim 17, wherein the arbitration circuit is further configured to select a different access request based on a number of times access has been granted to a given bank specified in the different access request.

19. The non-transitory computer-readable storage medium of claim 14, wherein the arbitration circuit is further configured to, when scheduling access requests associated with a lowest level arbitration category, select a different access request associated with a low latency virtual channel.

20. The non-transitory computer-readable storage medium of claim 14, wherein the arbitration circuit is further configured to, in response to a determination that no credits are available for a given virtual channel for a given bank, treat access requests associated with the given virtual channel as having a lowest level arbitration category.

* * * * *